United States Patent
Hsu et al.

(10) Patent No.: US 9,363,115 B2
(45) Date of Patent: Jun. 7, 2016

(54) SYSTEM AND METHOD FOR ALIGNING DATA BITS

(75) Inventors: Ying-Yu Hsu, Hsinchu (TW); Ruey-Bin Sheen, Taichung (TW); Shih-Hung Lan, Jhubei (TW); Chih-Hsien Chang, Taipei (TW)

(73) Assignee: Taiwan Semiconductor Manufacturing Co., Ltd., Hsin-Chu (TW)

(*) Notice: Subject to any disclaimer, the term of this patent is extended or adjusted under 35 U.S.C. 154(b) by 51 days.

(21) Appl. No.: 13/539,519

(22) Filed: Jul. 2, 2012

(65) Prior Publication Data

US 2014/0006883 A1  Jan. 2, 2014

(51) Int. Cl.
G06F 11/07 (2006.01)
H04L 25/14 (2006.01)
G06F 13/16 (2006.01)

(52) U.S. Cl.
CPC ............ *H04L 25/14* (2013.01); *G06F 13/1689* (2013.01)

(58) Field of Classification Search
CPC ............... G01R 31/3161; G01R 31/31937; G01R 31/31725; G01R 31/31922; H04L 25/14; G11B 20/20; G06F 13/1689

USPC .......................................... 714/700
See application file for complete search history.

(56) References Cited

U.S. PATENT DOCUMENTS

| | | | |
|---|---|---|---|
| 7,970,087 B2* | 6/2011 | Millman | 375/355 |
| 2002/0196883 A1* | 12/2002 | Best et al. | 375/355 |
| 2006/0140321 A1* | 6/2006 | Tell et al. | 375/376 |
| 2006/0184817 A1* | 8/2006 | Dreps et al. | 713/503 |
| 2006/0193395 A1* | 8/2006 | Ferraiolo et al. | 375/265 |
| 2009/0006730 A1* | 1/2009 | Gara et al. | 711/105 |
| 2010/0095168 A1* | 4/2010 | Jeddeloh | 714/720 |
| 2010/0118627 A1* | 5/2010 | Best | 365/193 |
| 2012/0066445 A1* | 3/2012 | Searles et al. | 711/106 |

* cited by examiner

*Primary Examiner* — Albert Decady
*Assistant Examiner* — Kyle Vallecillo
(74) *Attorney, Agent, or Firm* — Duane Morris LLP (57) ABSTRACT

Systems and methods are disclosed for aligning multiple data bits by adjusting the timing of input lines for those data bits. Embodiments include a hierarchical structure for comparing the timing of multiple sets of bits. Other embodiments include aligning data bits from multiple chips in a 3D die stacking architecture.

16 Claims, 11 Drawing Sheets

SYSTEM AND METHOD FOR ALIGNING DATA BITS

BACKGROUND

Three-dimensional ("3D") integrated circuits ("ICs") are becoming more prevalent in semiconductor architecture and the increased density of chips, and the concomitant increased throughput of data, in these architectures presents new obstacles to operation of these systems. For wide bandwidth chips, where multiple data bits are required to be read at the same (or approximately the same) time, mismatch between the timing of these chips creates problems in obtaining an accurate reading of each data bit.

As is known in the art, any particular bit has an "eye opening" time associated with that bit. Typically, the "eye opening" time for any particular bit is the time between the leading edge of the bit and the falling edge of the bit. If the data bit is sampled during the "eye opening" time the value of the bit will be read correctly by the sampling device.

Typically, a reading clock pulse is ideally aligned with the center, or near the center, of the "eye opening" of a data bit so as to maximize the probability that the data bit will be read correctly. However, when there are multiple bits that are to be read on the same clock pulse and those multiple bits arrive at the sampling device at different times, the effective "eye opening" of the combined bits is reduced and/or is non-existent in extreme cases. These differences in arrival times of the various individual bits may result in a bit being read during a time other than during the "eye opening" of that bit resulting in a misreading of that bit. Consequently, errors in data occur which may lead to performance degradations and/or system failure.

Thus, there exists a need to solve the above deficiency.

2

DETAILED DESCRIPTION

With reference to the figures where like elements have been given like numerical designations to facilitate an understanding of the present subject matter, various embodiments of a system and method for compensating for timing misalignments are described. In order to more fully understand the present subject matter, a brief description of applicable circuitry will be helpful.

Figure 1:
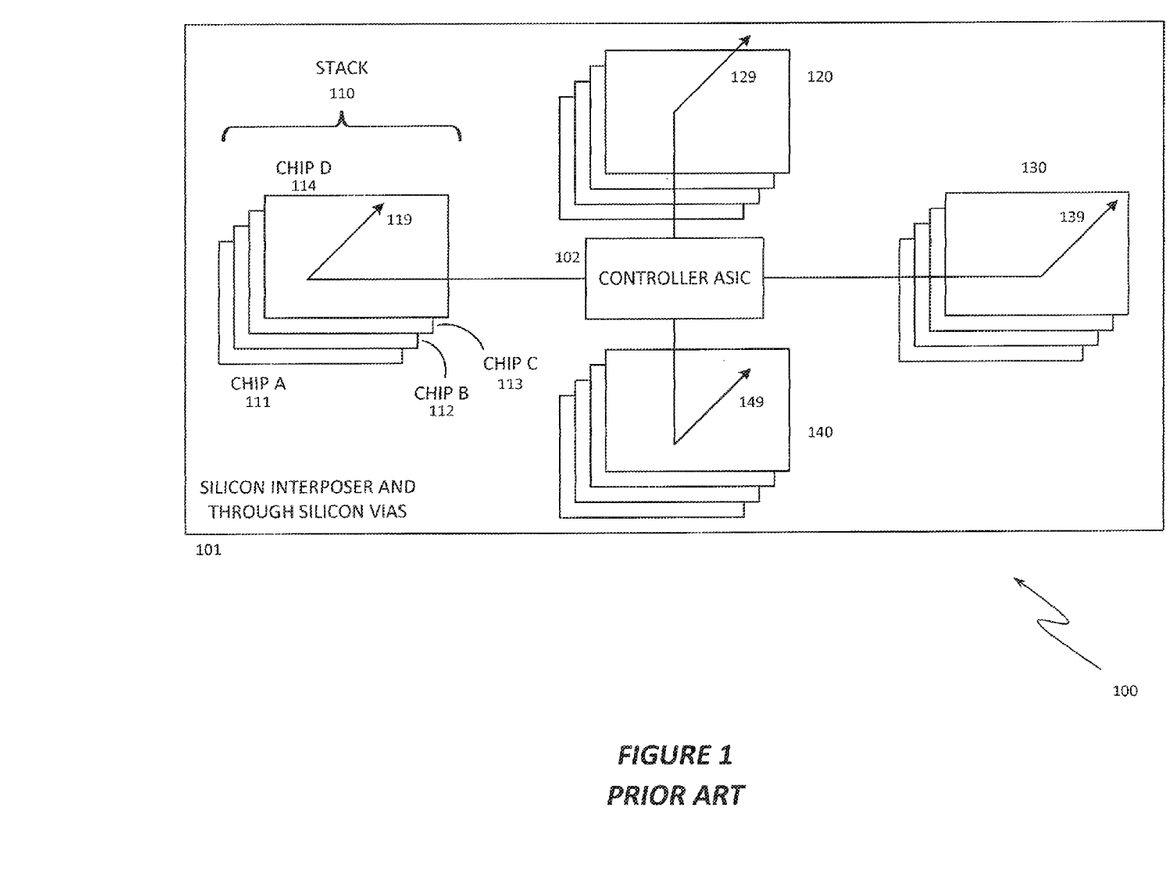
FIG. 1 is an illustration of an exemplary 3D die stacking architecture.

FIG. 1 is an illustration of an exemplary prior art 3D die stacking architecture 100. Chip stack 110 includes chip A (111), chip B (112), chip C (113) and chip D (114) vertically stacked one on another. Similarly, chip stacks 120, 130, and 140 each include four vertically stacked chips. These four chip stacks are each controlled by controller ASIC 102 as shown by arrows 119, 129, 139, and 149, respectively. The connections between the controller ASIC 102 and each of the chip stacks 110, 120, 130, and 140 traverse silicon interposer 101 by way of through silicon vias ("TSV"), as is known in the art. Variations in chip manufacture and/or differences in connections between the chip stacks and the controller ASIC may lead to mismatch in timing of data bits that are to be sampled simultaneously at a given sampling clock pulse.

Figure 2:
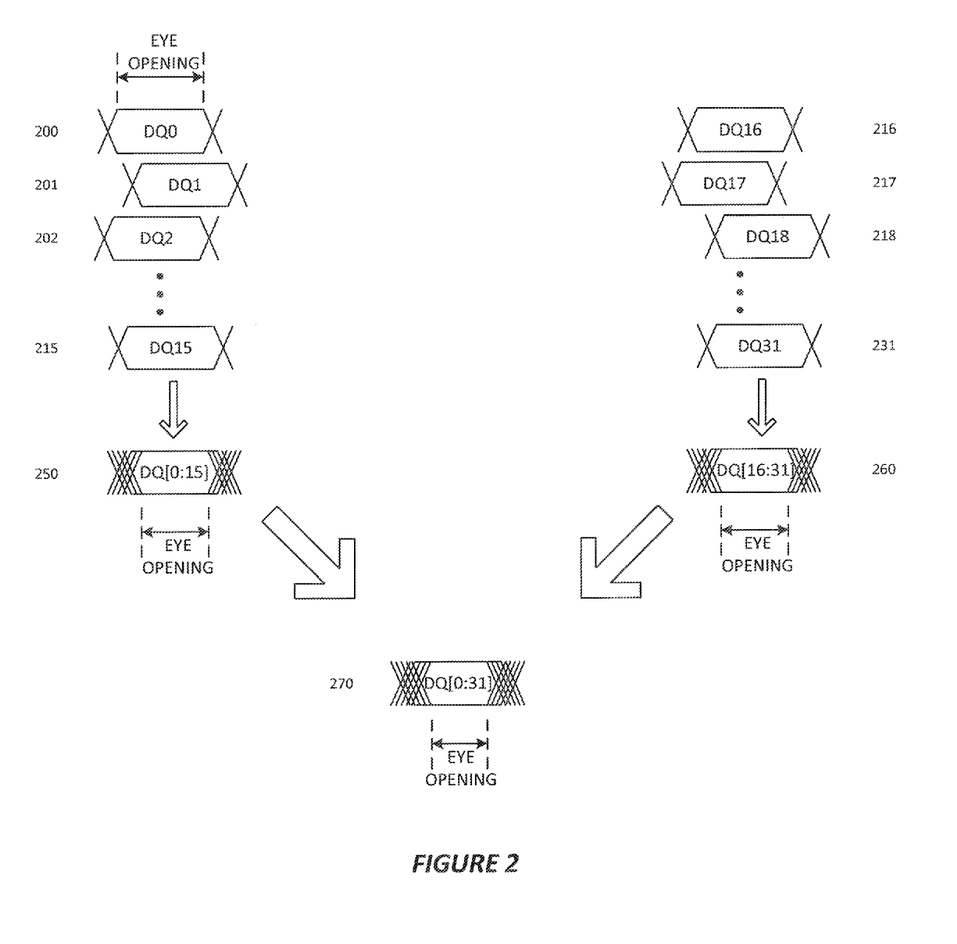
FIG. 2 is a notional view of data eye openings for different data bits and groups of data bits.

FIG. 2 depicts a notional view of data eye openings for different data bits and groups of data bits that traverse the 3D architecture of FIG. 1. For example, the data eye opening for data bit 200 (identified as DQ0) is shown. Other single data bits have similar eye openings that are generally the same duration in time. Data bits 200, 201, 202, and 215 (DQ0 through DQ15) represent two bytes of information (16 bits) and the relative position of each in FIG. 2 can be understood to represent an arrival time of the bits at a sampling device (where the sampling device samples all 16 bits simultaneously) or, alternatively, the relative position of each bit when a reading/sampling clock pulse occurs so that the sampling device reads each of the 16 data bits. Note that in FIG. 2 the bits are not exactly aligned so that the combination of the 16 bits, shown at reference number 250 as DQ[0:15], has a combined eye opening that is narrower than for any one of the individual bits. Similarly, data bits 216, 217, 218, and 231 (DQ16 through DQ31) represent an additional 16 bits of information. When these 16 bits are combined at reference number 260 as DQ[16:31], the combined eye opening is narrower than for any one of the individual bits DQ16 through DQ31. At reference number 270 (DQ[0:31]), the 16 bits of DQ[0:15] and the 16 bits of DQ[16:31] are combined which results in an even narrower eye opening for the 32 data bits comprising DQ[0:31] than for either DQ[0:15] or DQ[16:31], as would be expected.

One of skill in the art can readily understand that as more data bits are simultaneously sampled, say, for example, 128 bits, 512 bits, etc., differences in arrival time of the data bits at a sampling device greatly increases the chances of some of those bits being read in error due to the narrow eye opening of the combined bits. Thus, minimization or elimination of these data errors becomes more acute as the number of bits sampled simultaneously increases.

Figure 3:
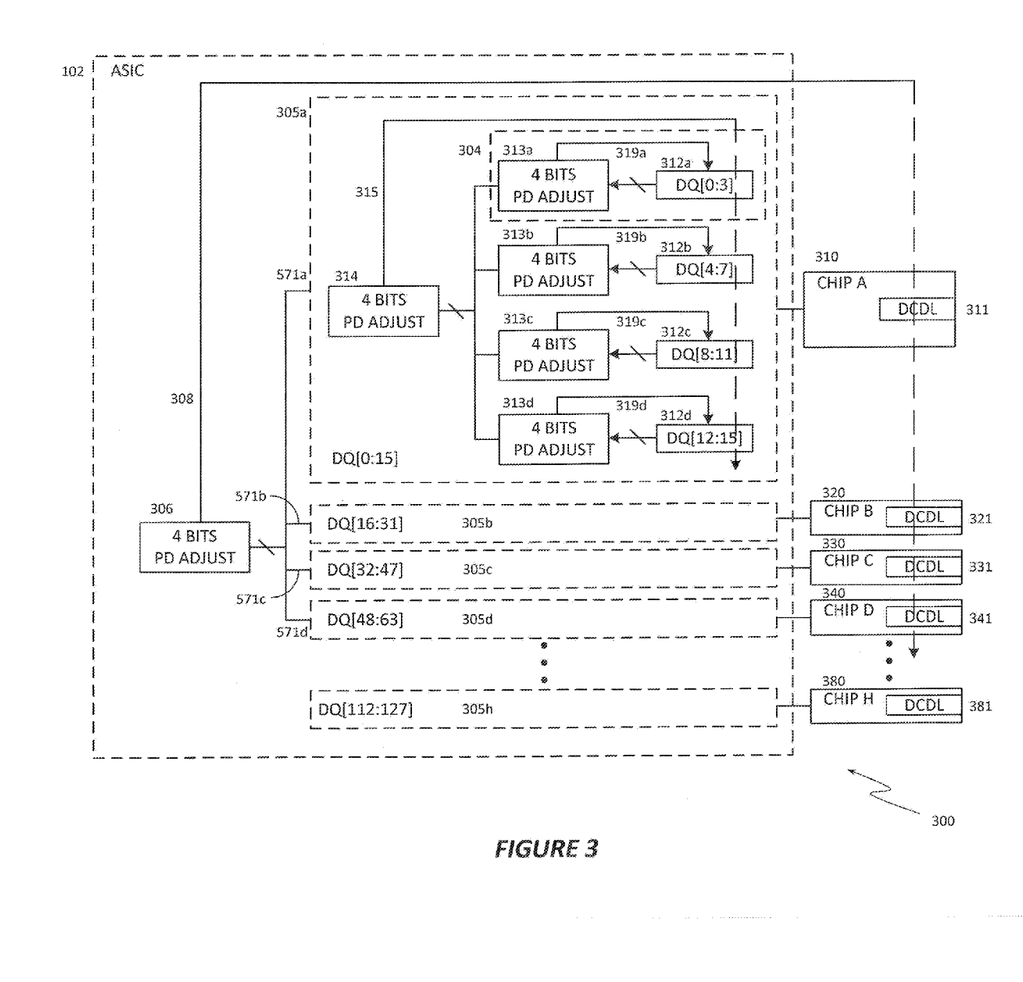
FIG. 3 is high-level block diagram of a system for aligning multiple data bits showing a hierarchy of alignment loops according to an embodiment of the present subject matter.

With attention now directed towards FIG. 3, a high-level block diagram 300 of a system for aligning multiple data bits showing a hierarchy of alignment loops is illustrated, according to an embodiment of the present subject matter. Chip A (310), chip B (320), chip C (330), and chip D (340) are, in an exemplary embodiment, stacked together in a 3D chip stack, as shown in FIG. 1. Similarly, other chips (e.g., chips E, F, G, and H, where only chip H is shown for clarity) may be stacked in a second 3D chip stack. Each of these chips includes a digitally-controlled delay line ("DCDL") 311, 321, 331, 341, . . . 381, the function of which will be discussed in detail below.

Focusing now on chip A, 16 data bits are sent from chip A to controller ASIC 102. The 16 bits are grouped into 4 groups of 4 bits each: DQ[0:3] (312a), DQ[4:7] (312b), DQ[8:11] (312c), and DQ[12:15] (312d). Referring to data bits DQ[0:3], these bits are input to block 313a labeled "4 BITS PD ADJUST" (where "PD" means "phase delay") which operates on the bits, as discussed in further detail below, and sends a control signal 319a back to one or more of the input lines associated with data bits DQ[0:3]. This alignment loop 304 is discussed in more detail below with respect to FIG. 4. Similarly, data bits DQ[4:7] are input to block 313b which operates on these bits and sends a control signal 319b back to one or more of the input lines associated with data bits DQ[4:7]. Likewise, data bits DQ[8:11] are input to block 313c which operates on these bits and sends a control signal 319c back to one or more of the input lines associated with data bits DQ[8:11]; and data bits DQ[12:15] are input to block 313d which operates on these bits and sends a control signal 319d back to one or more of the input lines associated with data bits DQ[12:15].

Each of the blocks 313a, 313b, 313c, and 313d pass one data bit to block 314 which operates on the four data bits it receives and sends a control signal 315 back to one or more of the input lines associated with data bits DQ[0:15], as discussed below with respect to FIG. 5. Additionally, FIG. 5 explains the operation of both levels of alignment loops (the inner loop being block 304) contained in block 305a. As with block 305a, blocks 305b, 305c, 305d, . . . 305h operate in a similar manner with the respective data bits input thereto.

With attention now directed towards blocks 305a, 305b, 305c, and 305d, which operate on data bits from chips A, B, C, and D, respectively, each of blocks 305a, 305b, 305c, and 305d pass one data bit, 571a, 571b, 571c, and 571d, respectively, to block 306 which operates on these bits and sends control signal 308 to one or more of the DCDLs 311, 321, 331, and 341 of chips A, B, C, and D, respectively. It will be understood by those of skill in the art that other stacks of chips will have similar configurations, which are not shown in FIG. 3 for the sake of clarity.

Figure 4:
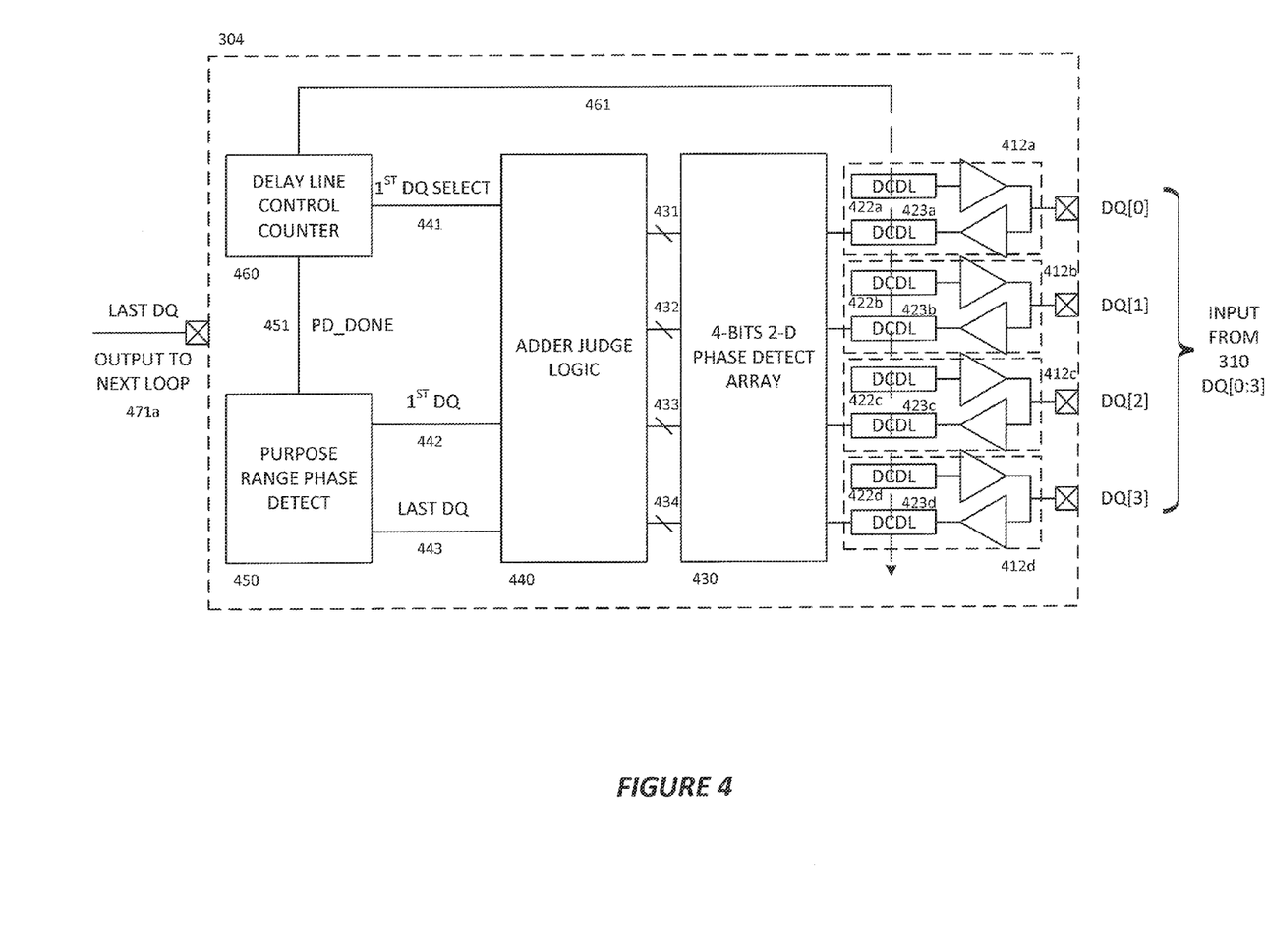
FIG. 4 is a functional block diagram of a first alignment loop in FIG. 3 according to an embodiment of the present subject matter.

Considering FIG. 4, a functional block diagram of the first alignment loop 304 in FIG. 3 is depicted, according to an embodiment of the present subject matter. Data bits DQ[0], DQ[1], DQ[2], and DQ[3] are input from chip A 310 via silicon interposer and through silicon vias and pass through input paths 412a, 412b, 412c, and 412d, respectively, which include bi-directional IO (input/output) circuitry which stores the input data bits DQ[0] through DQ[3] in their respective input paths. Using input path 412a as an example, input path 412a for data bit DQ[0] includes a DCDL 422a and a DCDL 423a, each of which are selectively controlled by control signal 461 sent from the Delay Line Control Counter 460, as will be discussed further below. Similarly, input path 412b for data bit DQ[1] includes DCDL 422b and DCDL 423b, each selectively controlled by control signal 461; input path 412c for data bit DQ[2] includes DCDL 422c and DCDL 423c, each selectively controlled by control signal 461; and input path 412d for data bit DQ[3] includes DCDL 422d and DCDL 423d, each selectively controlled by control signal 461.

When the data bits DQ[0] through DQ[3] are initially input to the first alignment loop 304, the data bits pass through the respective input path to the 4-Bits 2-D Phase Detect Array 430 which determines outputs signals 431 through 434 based on the relative timing (phase detection) of the data bits DQ[0] through DQ[3]. The operation of the 4-Bits 2-D Phase Detect Array 430 will be discussed in detail with respect to FIG. 6. Signals 431 through 434 are then input into Adder Judge Logic circuit 440 which compares the signals 431 through 434 and outputs a first DQ select signal 441 which is sent to the Delay Line Control Counter 460, a first DQ signal 442 and a last DQ signal 443, each of which are sent to the Purpose Range Phase Detect 450. The first DQ signal 442 identifies which of the data bits DQ[0] through DQ[3] is the first to arrive (i.e., first in phase) when received at the 4-Bits 2-D Phase Detect Array 440. Likewise, the last DQ signal 443 identifies which of the data bits DQ[0] through DQ[3] is the last to arrive (i.e., last in phase) when received at the 4-Bits 2-D Phase Detect Array 440. The first DQ select signal 441 identifies the DCDLs to be activated so that a delay is inserted in the input path of the first-to-arrive DQ bit (associated with the first DQ signal 442).

The Purpose Range Phase Detect 450 operates on the first DQ signal 442 and a last DQ signal 443 to determine if the phase detection process is completed. If the phase detection process is completed, e.g., when the leading edges of the data bits DQ[0] through DQ[3] are within an acceptable tolerance of each other, as discussed below with respect to FIGS. 8A and 8B, the Purpose Range Phase Detect 450 sends a PD_DONE signal 451 to the Delay Line Control Counter 460. The operation of the Purpose Range Phase Detect 450 will be discussed in more detail below.

The Delay Line Control Counter 460 receives the first DQ select signal 441 and if the PD_DONE signal 451 is not received, sends control signal 461 to the appropriate DCDL, i.e., the DCDL in the input path of the first-to-arrive DQ bit. If the PD_DONE signal 451 is received, then the last DQ signal 443 is output 471a to the next level alignment loop 305a (as shown in FIG. 3).

Assuming that the Delay Line Control Counter 460 does not receive a PD_DONE 451 signal and assuming that the first DQ signal 442 is for DQ[0], the Delay Line Control Counter 460 sends control signal 461 to DCDL 423a in input path 412a for data bit DQ[0]. Thus, the stored data bit DQ[0] is delayed by a selectable amount (as discussed below with respect to FIGS. 8A and 8B) and the delayed version of DQ[0] is input into the 4-Bit 2-D Phase Detect Array 430 along with DQ[1] through DQ[3] (which were not delayed). The 4-Bit 2-D Phase Detect Array 430 operates as discussed above passing signals 431 through 434 to the Adder Judge Logic circuit 440 which re-determines the first DQ signal 442 and the first DQ select signal 441. As with the description above, the Purpose Range Phase Detect 450 operates on the re-determined first DQ signal 442 and the last DQ signal 443 to re-determine if the phase detection process is completed. If the phase detection process is completed, e.g., when the leading edges of the delayed data bit DQ[0] and the last non-delayed data bits, one of DQ[1] through DQ[3], are within an acceptable tolerance of each other, the Purpose Range Phase Detect 450 sends a PD_DONE signal 460 to the Delay Line Control Counter 460, as stated above. The Delay Line Control Counter 460 receives the re-determined first DQ select signal 441 and if the PD_DONE signal 451 is not received, sends control signal 461 to the appropriate DCDL, i.e., the DCDL in the input path of the re-determined first-to-arrive DQ bit. If the PD_DONE signal 451 is received, then the last DQ signal 443 is output 471a to the next level alignment loop 305a (as shown in FIG. 3).

Figure 5:
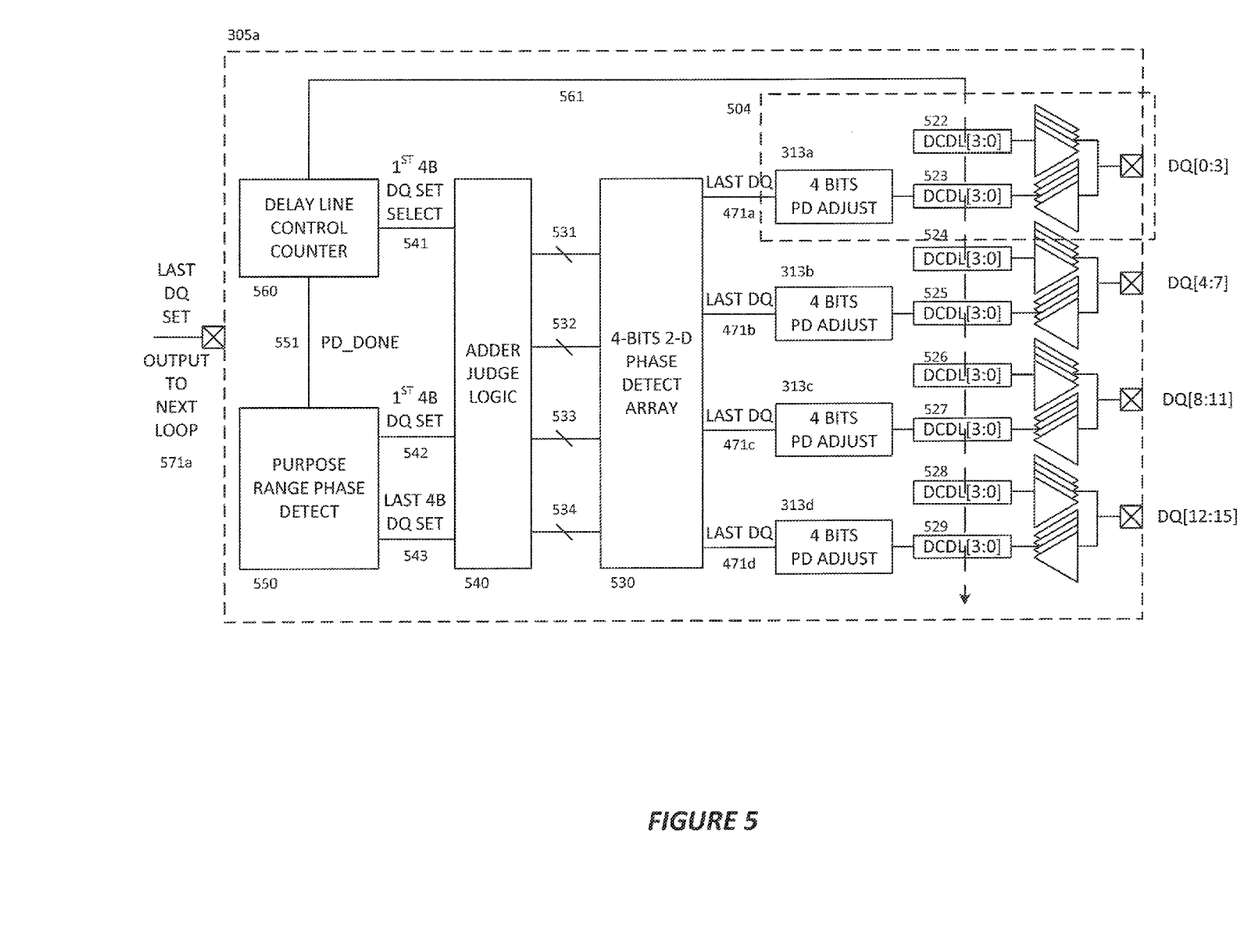
FIG. 5 is a functional block diagram of a first and second alignment loop in FIG. 3 according to an embodiment of the present subject matter.

With attention now directed towards FIG. 5, a functional block diagram of a first and second alignment loop 305a in FIG. 3 is presented, according to an embodiment of the present subject matter. The block 504 represents the first (or inner) loop 304 of FIG. 3, which operates on data bits DQ[0:3]. DCDL 522 represents DCDLs 422a through 422d in FIG. 4 which DCDL 523 represents DCDLs 423a through 423d. The grouping of these DCDLs will become obvious. Similarly, data bits DQ[4:7] are input into circuitry similar to that discussed above for block 504: each of DCDL 524 and DCDL 525 represent four DCDLs arranged comparable to DCDLs 422a through 422d and DCDLs 423a through 423d, respectively. Analogously, data bits DQ[8:11] are input into circuitry similar to that discussed above for block 504 where each of DCDL 526 and DCDL 527 represent four DCDLs arranged comparable to DCDLs 422a through 422d and DCDLs 423a through 423d, respectively; and data bits DQ[12:15] are input into circuitry similar to that discussed above for block 504: each of DCDL 528 and DCDL 529 represent four DCDLs arranged comparable to DCDLs 422a through 422d and DCDLs 423a through 423d, respectively.

As discussed above with respect to FIG. 4, the output of block 504, last DQ signal 471a, is input into the next level loop. Similar signals 471b, 471c, and 471d are also output from their respective first loops and input into the next level loop. The signals 471a through 471d each represent a group of 4 data signals, respectively: DQ[0:3], DQ[4:7], DQ[8:11], and DQ[12:15]. Thus, the next level loop 305a operates on 4 bits at a time like the inner loop 304 described in FIG. 3. However, where the inner loop 304 determines the relative timing/phase between 4 bits to identify the first DQ bit and the last DQ bit, the loop 305a operates to determine the relative timing/phase between 4 sets of bits to identify the first DQ set of bits and the last DQ set of bits. This hierarchical arrangement requires fewer circuits than would be necessary if, for example, the timing/phase difference between 8 or more bits were to attempt to be determined all at once.

The last DQ signals 471a through 471d are input to the 4-Bit 2-D Phase Detect Array 530 which operates on these four bits in a similar manner as that described for the 4-Bit 2-D Phase Detect Array 430 in FIG. 4. Likewise, signals 531 through 534 are determined based on the relative timing (phase detection) of the last DQ signals 471a through 471d. Signals 531 through 534 are input to the Adder Judge Logic circuit 540 which compares the signals 531 through 534 and outputs a first 4-bit DQ set select signal 541 which is sent to the Delay Line Control Counter 560, a first 4-bit DQ set signal 542 and a last 4-bit DQ set signal 543, each of which are sent to the Purpose Range Phase Detect 550. Analogously to the similarly-numbered signals in FIG. 4, the first 4-bit DQ set signal 542 identifies which of the last DQ bits 471a through 471d (each of which represent a set of 4 bits) is the first to arrive (i.e., first in phase) when received at the 4-Bits 2-D Phase Detect Array 540. Likewise, the last 4-bit DQ set signal 543 identifies which of the last DQ bits 471a through 471d (each of which represent a set of 4 bits) is the last to arrive (i.e., last in phase) when received at the 4-Bits 2-D Phase Detect Array 540. The first 4-bit DQ set select signal 541 identifies the DCDLs to be activated so that a delay is inserted in the input path of the first-to-arrive 4-bit DQ set (associated with the first 4-bit DQ set signal 542).

The Purpose Range Phase Detect 550 operates on the first 4-bit DQ set signal 542 and a last 4-bit DQ set signal 543 to determine if the phase detection process is completed. If the phase detection process is completed, e.g., when the leading edges of the sets of data bits DQ[0:3] through DQ[12:15] are within an acceptable tolerance of each other, the Purpose Range Phase Detect 550 sends a PD_DONE signal 551 to the Delay Line Control Counter 560.

The Delay Line Control Counter 560 receives the first 4-bit DQ set select signal 541 and if the PD_DONE signal 551 is not received, sends control signal 561 to the appropriate sets of DCDL, i.e., the set of DCDLs in the input path of the first-to-arrive set of DQ bits. If the PD_DONE signal 551 is received, then the last 4-bit DQ set signal 543 is output 571a to the next level alignment loop.

Assuming that the Delay Line Control Counter 560 does not receive a PD_DONE 551 signal and assuming that the first 4-bit DQ set signal 542 is for DQ[0:3], the Delay Line Control Counter 560 sends control signal 561 to DCDL set 523 in the input path for data bits DQ[0:3]. Thus, the stored data bits for DQ[0:3] are delayed by a selectable amount and the delayed version of DQ[0:3] is input into the 4-Bit 2-D Phase Detect Array 530 (i.e., last DQ 471a) along with the last DQ 471b, last DQ 471c, and last DQ 471d (each of which were not delayed). The 4-Bit 2-D Phase Detect Array 530 operates as discussed above passing signals 531 through 534 to the Adder Judge Logic circuit 540 which re-determines the first 4-bit DQ set signal 542 and the first 4-bit DQ set select signal 541. As with the description above, the Purpose Range Phase Detect 550 operates on the re-determined first 4-bit DQ set signal 542 and the last 4-bit DQ set signal 543 to re-determine if the phase detection process is completed. If the phase detection process is completed, e.g., when the leading edges of the delayed last DQ 471a and the last non-delayed data bits, one of last DQ 471b, last DQ 471c, and last DQ 471d, are within an acceptable tolerance of each other, the Purpose Range Phase Detect 550 sends a PD_DONE signal 560 to the Delay Line Control Counter 560, as stated above. The Delay Line Control Counter 560 receives the re-determined first 4-bit DQ set select signal 541 and if the PD_DONE signal 551 is not received, sends control signal 561 to the appropriate set of DCDLs, i.e., the set of DCDLs in the input path of the re-determined first-to-arrive last DQ bit. If the PD_DONE signal 551 is received, then the last 4-bit DQ set signal 543 is output 571a to the next level alignment loop.

As seen in FIG. 3, the output of block 305a (signal 571a) is combined with the outputs of blocks 305b (signal 571b), 305c (signal 571c), and 305d (signal 571d). Signals 571a through 571d are input into the 4-Bits PD Adjust block 306 which operates on these signals analogously to the discussion regarding block 304 and data bits DQ[0:3]. Thus, the details of 4-Bits PD Adjust block 306 are omitted from the drawings for the sake of clarity. 4-Bits PD Adjust block 306 sends control signal 308 to DCDLs 311 through 341 on chips A through D, respectively, to control the phase differences between the signals 571a through 571d being received by the appropriate circuitry in the 4-Bits PD Adjust block 306.

As can be readily understood by one of skill in the art, in embodiments of the present subject matter further hierarchical levels are contemplated such as for stacks with more than 4 chips and/or between stacks of chips. Additionally, those of skill in the art will understand that the present subject matter is not limited to those embodiments where only 4 bits are operated on at any one hierarchical level.

Figure 6:
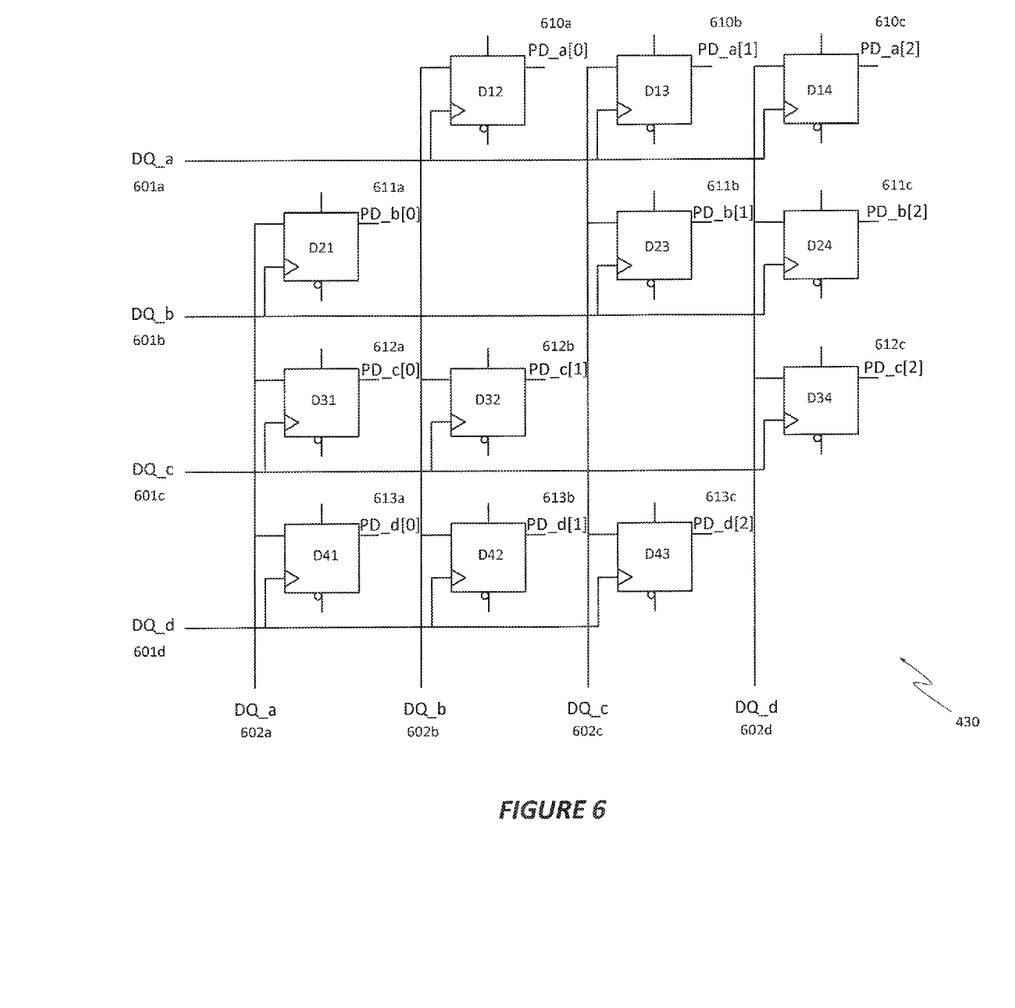
FIG. 6 is an exemplary circuit of the 4-bits 2-D Phase Detect Array block of FIG. 4 according to an embodiment of the present subject matter.

Considering now FIG. 6, an exemplary circuit of the 4-bits 2-D Phase Detect Array block 430 of FIG. 4 is shown, according to an embodiment of the present subject matter. While the operation of the 4-bit 2-D Phase Detect Array of FIG. 6 will be explained with respect to block 430 in FIG. 4, it will be understood by those of skill in the art that the explanation of the 4-bit 2-D Phase Detect Array operation can be applied to any similar structure (e.g., block 530 of FIG. 5) and used at any level of the hierarchical loop structure discussed herein.

In FIG. 6, 4 bits, designated DQ_a (601a), DQ_b (601b), DQ_c (601c), and DQ_d (601d), are input into the left of the array in the drawing (i.e., on the respective clock lines) and the same signals, designated DQ_a (602a), DQ_b (602b), DQ_c (602c), and DQ_d (602d), are input into the bottom of the array in the drawing (i.e., on the respective data lines). In the array, a D flip-flop ("DFF"), or any similar circuit, is located in each location where different signals will be input to the DFF on the data and clock lines. Thus, there is no DFF D11, and DFF D12 is the DFF located on the first row (with DQ_a as input on the clock line of the DFF) and the second column (with DQ_b as input on the data input line of the DFF). Thus, if DQ_a leads DQ_b, then the output of D12 (which is designated PD_a[0] (610a)) is zero. Likewise, if DQ_a lags DQ_b, then the output of D12 (610a) is one. A similar analysis pertains for the remaining DFFs shown in FIG. 6. As a result, the signals 431 through 434 in FIG. 4 include the following outputs from the array in FIG. 6:

Signal 431: DFF outputs 610a, 610b, and 610c
Signal 432: DFF outputs 611a, 611b, and 611c
Signal 433: DFF outputs 612a, 612b, and 612c
Signal 434: DFF outputs 613a, 613b, and 613c

As discussed with respect to FIG. 4, signals 431 through 434 are input into the Adder Judge Logic circuit 440.

Figure 7:
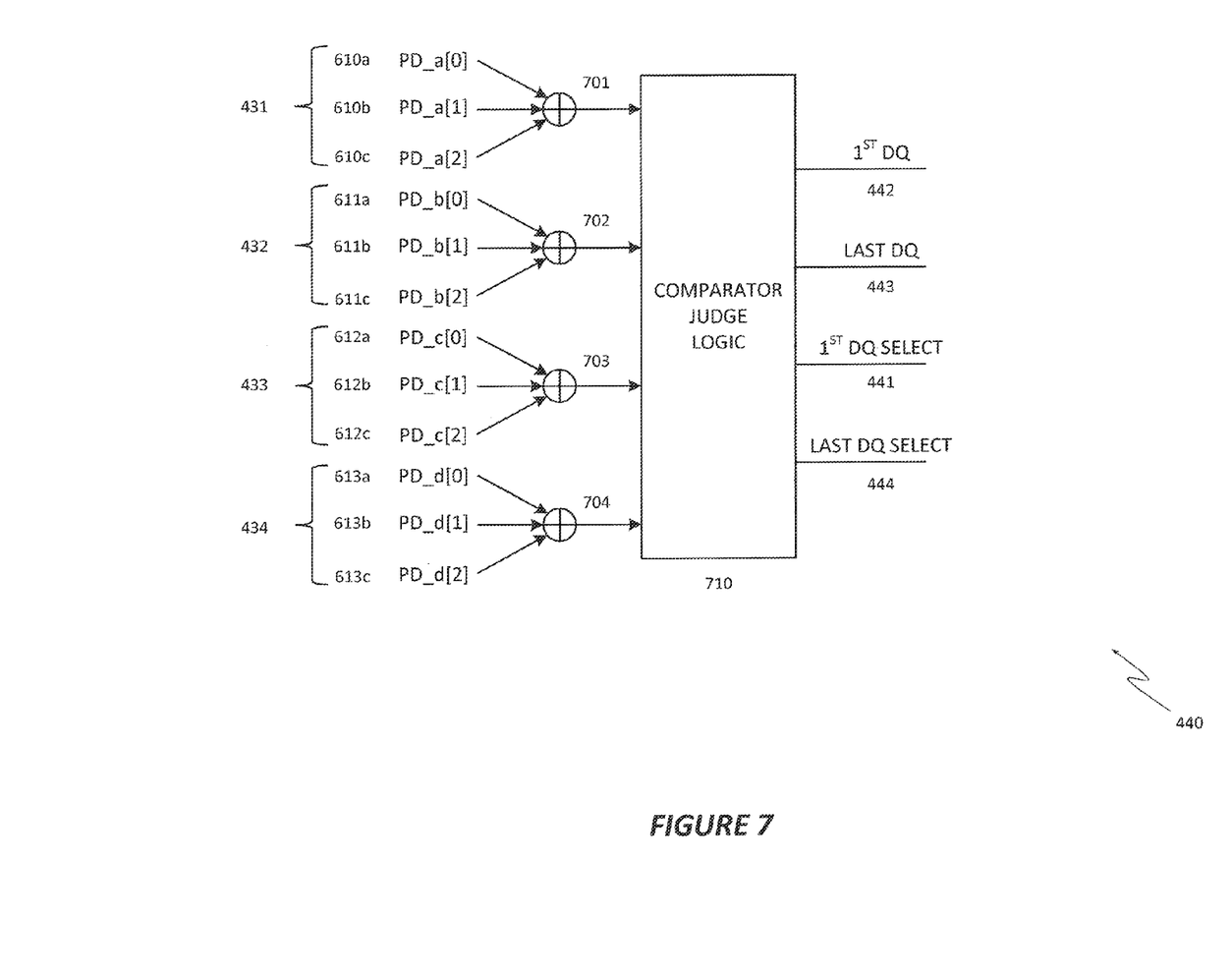
FIG. 7 is an exemplary circuit of the Adder Judge Logic block of FIG. 4 according to an embodiment of the present subject matter.

Focusing now on FIG. 7, an exemplary circuit of the Adder Judge Logic block 440 of FIG. 4 is shown, according to an embodiment of the present subject matter. While the operation of the Adder Judge Logic block of FIG. 7 will be explained with respect to block 440 in FIG. 4, it will be understood by those of skill in the art that the explanation of the Adder Judge Logic operation can be applied to any similar structure (e.g., block 540 of FIG. 5) and used at any level of the hierarchical loop structure discussed herein.

In FIG. 7, signals 431 through 434, which are output from the 4-bits 2-D Phase Detect Array block 430 in FIG. 6, are input into the Adder Judge Logic block 440. As shown above, each of the input signals includes three DFF output signals. Taking signal 431 as an example, DFF output signals 610a, 610b, and 610c, which are either a logical 0 or a logical 1, are input into adder 701 which counts the number of logical 1 bits. The output of adder 701 is input into Comparator Judge Logic block 710. Likewise, the outputs of adders 702, 703, and 704, each of which counts the number of logical 1 bits in its respective input, is input into Comparator Judge Logic block 710. Comparator Judge Logic block 710 compares its inputs. The input with the most logical 1 bits is the last DQ and is output on the last DQ line 443. The input with the least logical 1 bits is the first DQ and is output on the first DQ line 442. For example, if the DQ_a bit (601a in FIG. 6) is the earliest bit and the DQ_d bit (601d in FIG. 6) is the latest bit, then the output of D12, D13, and D14 (610a, 610b, and 610c, respectively) will each be a logical 0 while the output of D41, D42, and D43 (613a, 613b, and 613c, respectively) will each be a logical 1. Thus, the Comparator Judge Logic block 710 in FIG. 7 will identify data bit DQ_a as the first DQ 442 and data bit DQ-d as the last DQ 443. Comparator Judge Logic block 710 will also output the first DQ select 441 signal to, for example, the Delay Line Control Counter 460 in FIG. 4 to identify the DCDLs associated with data bit DQ_a. In an embodiment, the Comparator Judge Logic block 710 will also output the last DQ select 444 signal which is used to identify the last DQ and pass that information to the next level of the alignment loop.

Figure 8A:
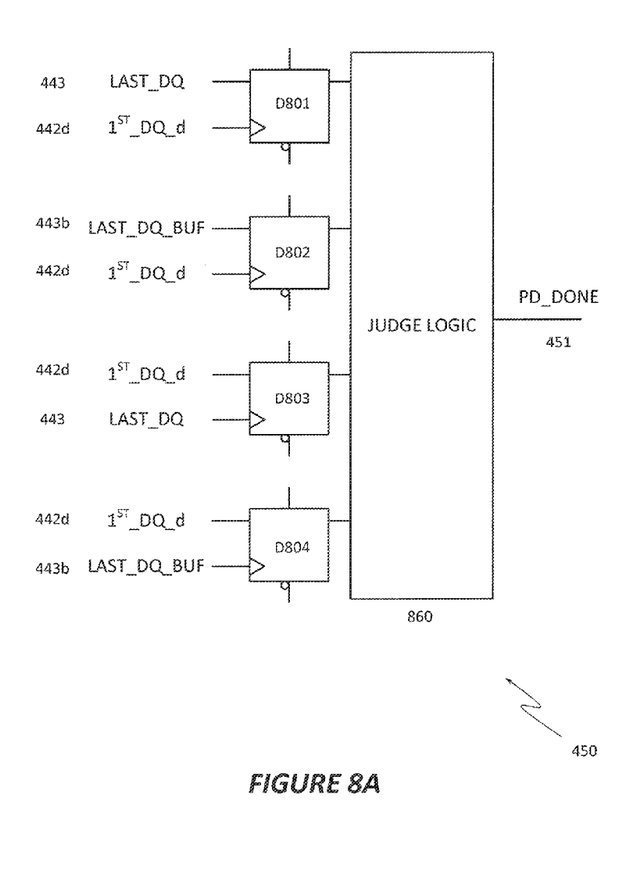
FIG. 8A is an exemplary circuit of the Purpose Phase Range Detect block of FIG. 4 according to an embodiment of the present subject matter.
Figure 8B:
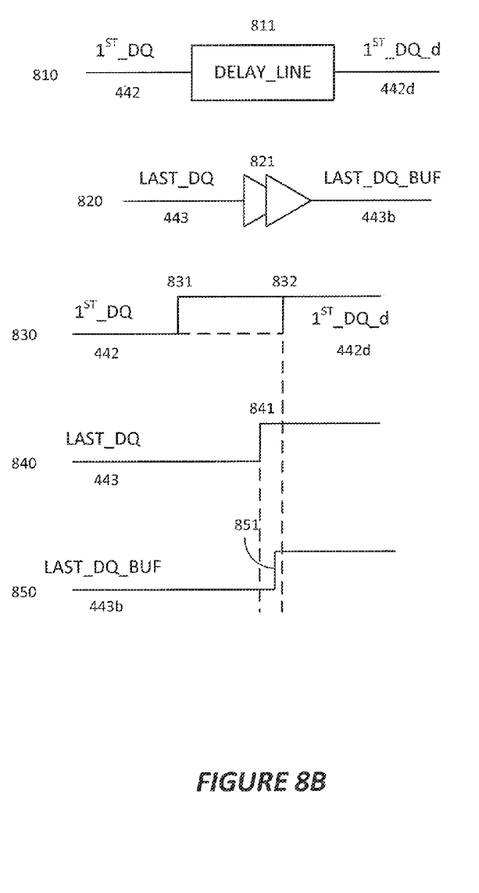
FIG. 8B illustrates exemplary operations of the Purpose Phase Range Detect block of FIG. 4 according to an embodiment of the present subject matter.

With attention now directed towards FIGS. 8A and 8B, FIG. 8A illustrates an exemplary circuit of the Purpose Range Phase Detect block 450 of FIG. 4, according to an embodiment of the present subject matter, while FIG. 8B illustrates exemplary operations of the Purpose Range Phase Detect block 450 of FIG. 4, according to an embodiment of the present subject matter. While the operation of the Purpose Range Phase Detect block of FIG. 8A will be explained with respect to block 450 in FIG. 4, it will be understood by those of skill in the art that the explanation of the Purpose Range Phase Detect operation can be applied to any similar structure (e.g., block 550 of FIG. 5) and used at any level of the hierarchical loop structure discussed herein.

As shown in FIG. 4, the inputs to the Purpose Range Phase Detect block 450 are the first DQ signal 442 and the last DQ signal 443. Each of these signals is used to produce an associated signal as shown at 810 and 820 in FIG. 8B, respectively. The first DQ signal 442 is passed through delay line 811, or equivalent circuitry, to produce a first DQ delay signal 442d. The last DQ signal 443 is passed through buffer 821, or equivalent circuitry, to produce a last DQ buffer signal 443b. The delay introduced by delay line 811 is selectable based, for example, on the hierarchical level and/or on performance of the overall system. As a non-limiting example, for the Purpose Range Phase Detect 450 of FIG. 4, the delay introduced is typically less than 100 picoseconds and may be in the range of 50-100 picoseconds, although other ranges are contemplated. Continuing with the non-limiting example, for the Purpose Range Phase Detect (not shown for clarity) that is included in the 4-Bits PD Adjust block 306 of FIG. 3, the delay introduced is typically less than 500 picoseconds and may be in the range of 200-500 picoseconds, although other ranges are contemplated. The last DQ buffer signal 443b produced and used by the Purpose Range Phase Detect 450 so as to eliminate uncertainty in the Judge Logic block 860 by ensuring early and later relationships between the signals input to the Judge Logic block 860.

In FIG. 8A, the first DQ signal 442, the first DQ delay signal 442d, the last DQ signal 443, and the last DQ buffer signal 443b are used as inputs to DFFs D801, D802, D803, and D804, which operate in a similar manner to the DFFs described with respect to FIG. 6. DFF D801 receives last DQ signal 443 on the data line and first DQ delay signal 442d on the clock line and outputs either a logical 0 (if first DQ delay signal 442d is earlier than last DQ signal 443) or a logical 1 (if first DQ delay signal 442d is later than last DQ signal 443). DFF D802 operates in a similar manner on last DQ buffer signal 443b on the data line and first DQ delay signal 442d on the clock line. DFF D803 operates in a similar manner on first DQ delay signal 442d on the data line and last DQ signal 443 on the clock line. DFF D804 operates in a similar manner on first DQ delay signal 442d on the data line and last DQ buffer signal 443b on the clock line.

The output signals from D801 through D804 are input into the Judge Logic block 860 which compares these signals as shown in the relative phase sketches 830, 840, and 850 of FIG. 8B (where time travels left to right). In sketch 830, the leading edge of first DQ signal 442 is shown at 831 while the leading edge of the first DQ delay signal 442d is shown at 832. The difference between leading edges 831 and 832 is the delay inserted by delay line 811. In sketch 840, the leading edge 841 of last DQ signal 443 is shown which, naturally, occurs later in time than the leading edge 831 of first DQ signal 442. In sketch 850, the leading edge 851 of last DQ buffer signal 443b is shown which, naturally, occurs later in time (typically by a relatively small amount) than the leading edge 841 of last DQ signal 443.

For sketch 840 where leading edge 841 occurs earlier than leading edge 832, the output of DFF D801 will be a logical 1 and the output of DFF D803 will be a logical 0. For the sketch 850 where leading edge 851 occurs earlier than leading edge 832, the output of DFF D802 will be a logical 1 and the output of DFF 804 will be a logical 0. Once this condition is reached, then the Judge Logic block 860 will output the PD_DONE signal 451.

Figure 9:
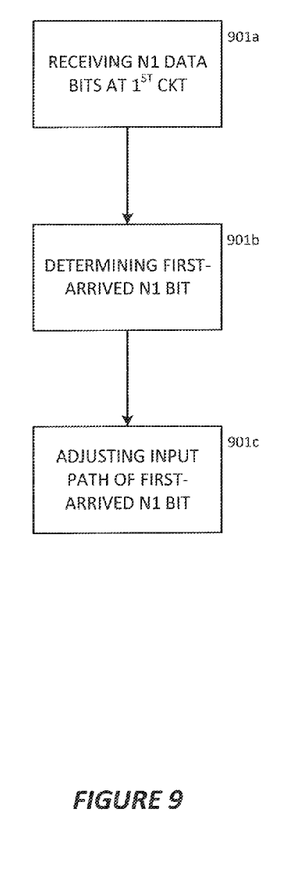
FIG. 9 is flow chart for a method for aligning multiple data bits according to an embodiment of the present subject matter.

Regarding FIG. 9, a flow chart is shown for a method for aligning multiple data bits according to an embodiment of the present subject matter. At block 901*a*, N1 data bits are received at a first circuit. In an embodiment, the N1 bits travel through separate input paths to the first circuit. At block 901*b*, the first-arrived N1 bit is determined. In an embodiment, the first-arrived N1 bit is determined as discussed above with respect to FIGS. 4-7. In an embodiment, the first-arrived N1 bit is determined based on a relative time of arrival of the leading edge of each of the N1 bits at the first circuit. At block 901*c*, the input path of the first-arrived N1 bit is adjusted. In an embodiment, the adjustment includes adding delay such as by a DCDL as described above.

Figure 10:
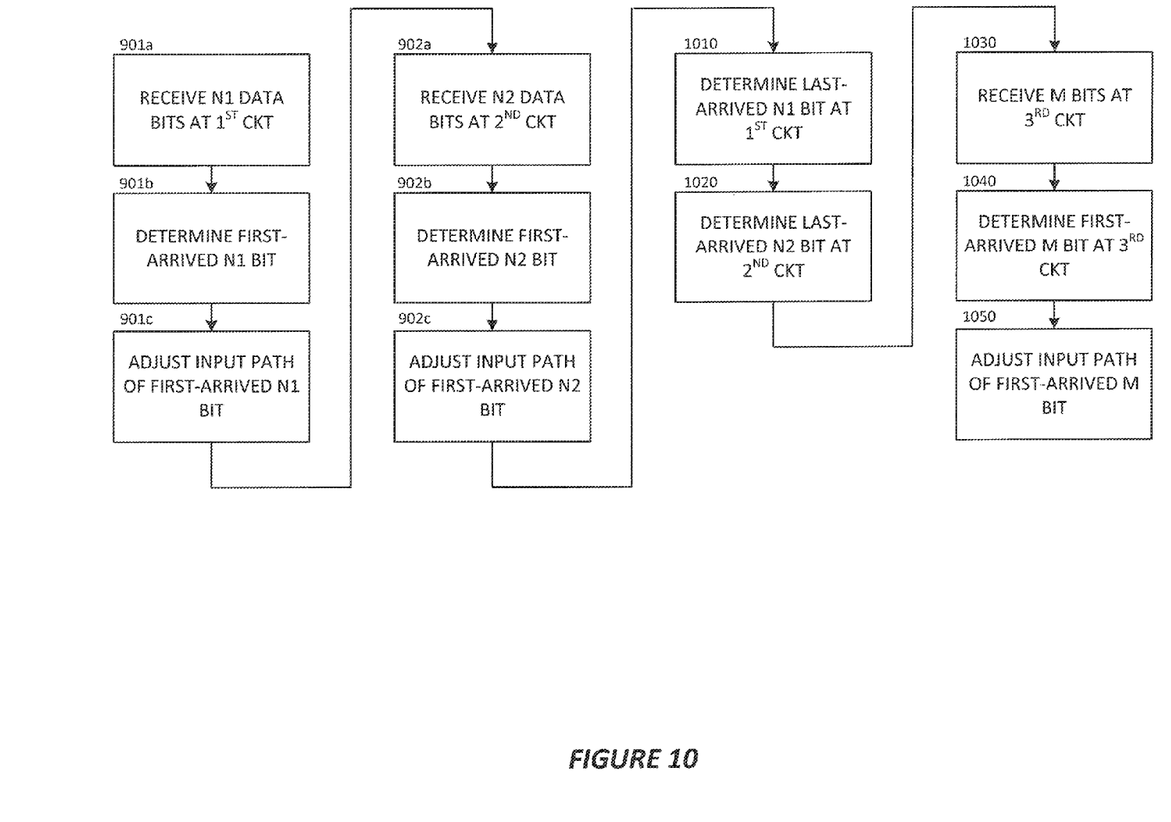
FIG. 10 is flow chart for a method for aligning multiple data bits according to another embodiment of the present subject matter.

In FIG. 10, a flow chart is shown for a method for aligning multiple data bits according to another embodiment of the present subject matter. Blocks 901*a* through 901*c* are as described above with respect to FIG. 9. At block 902*a*, N2 data bits are received at a first circuit. In an embodiment, the N2 bits travel through separate input paths to the second circuit. In an embodiment, the N1 bits and the N2 are mutually exclusive. At block 902*b*, the first-arrived N2 bit is determined. In an embodiment, the first-arrived N2 bit is determined as discussed above with respect to FIGS. 4-7. In an embodiment, the first-arrived N2 bit is determined based on a relative time of arrival of the leading edge of each of the N2 bits at the second circuit. At block 902*c*, the input path of the first-arrived N2 bit is adjusted. In an embodiment, the adjustment includes adding delay such as by a DCDL as described above. In an embodiment, N1=N2=4 bits. At block 1010, the last-arrived N1 bit at the first circuit is determined. In an embodiment, the last-arrived N1 bit is determined as discussed above with respect to FIGS. 4-7. At block 1020, the last-arrived N2 bit at the second circuit is determined. In an embodiment, the last-arrived N2 bit is determined as discussed above with respect to FIGS. 4-7. At block 1030, a third circuit receives M bits. In an embodiment, the M bits include the last-arrived N1 bit and the last-arrived N2 bit. At block 1040, the first-arrived M bit at the third circuit is determined. In an embodiment, the first-arrived M bit is determined based on a relative time of arrival of the leading edge of each of the M bits at the third circuit. At block 1050, the input path of the first-arrived M bit is adjusted. In an embodiment, the adjustment includes adding delay such as by a DCDL as described above.

Figure 11:
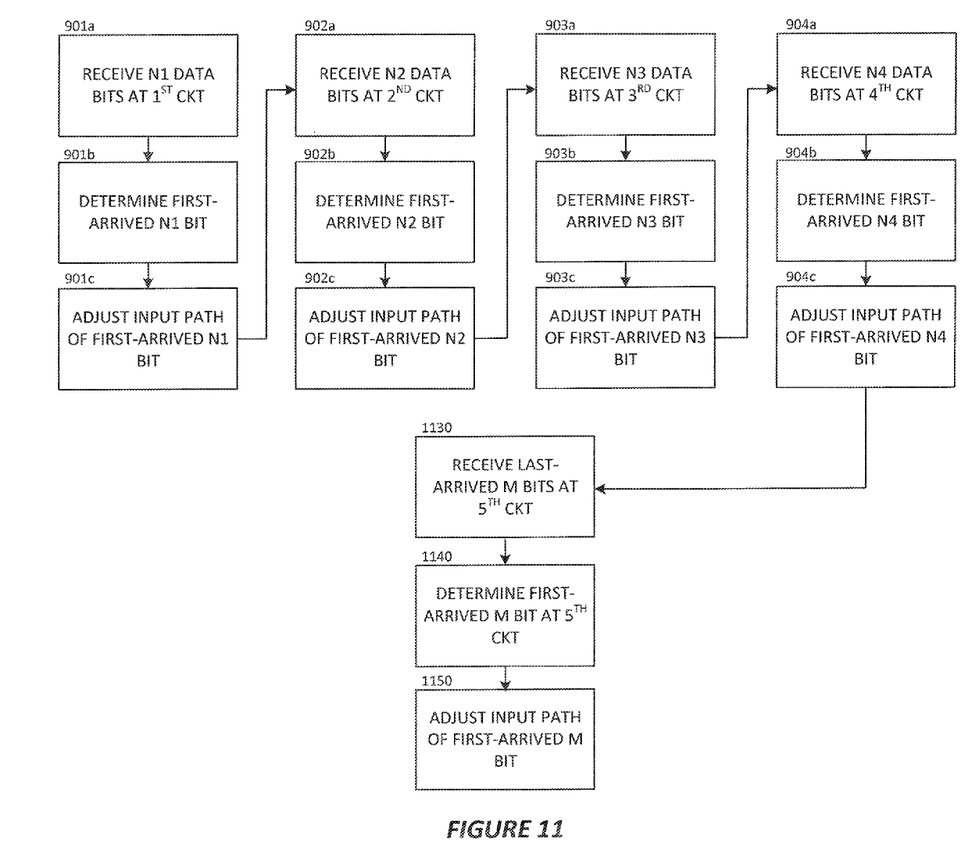
FIG. 11 is flow chart for a method for aligning multiple data bits according to another embodiment of the present subject matter.

With regard to FIG. 11, a flow chart is shown for a method for aligning multiple data bits according to another embodiment of the present subject matter. Blocks 901*a* through 901*c* and 902*a* through 902*c* are as described above with respect to FIG. 10. At block 903*a*, N3 data bits are received at a third circuit. In an embodiment, the N3 bits travel through separate input paths to the third circuit. In an embodiment, the N1, the N2, and the N3 bits are mutually exclusive. At block 903*b*, the first-arrived N3 bit is determined. In an embodiment, the first-arrived N3 bit is determined as discussed above with respect to FIGS. 4-7. In an embodiment, the first-arrived N3 bit is determined based on a relative time of arrival of the leading edge of each of the N3 bits at the third circuit. At block 903*c*, the input path of the first-arrived N3 bit is adjusted. In an embodiment, the adjustment includes adding delay such as by a DCDL as described above. At block 904*a*, N4 data bits are received at a fourth circuit. In an embodiment, the N4 bits travel through separate input paths to the fourth circuit. In an embodiment, the N1, the N2, the N3, and the N4 bits are mutually exclusive. At block 904*b*, the first-arrived N4 bit is determined. In an embodiment, the first-arrived N4 bit is determined as discussed above with respect to FIGS. 4-7. In an embodiment, the first-arrived N4 bit is determined based on a relative time of arrival of the leading edge of each of the N4 bits at the fourth circuit. At block 904*c*, the input path of the first-arrived N4 bit is adjusted. In an embodiment, the adjustment includes adding delay such as by a DCDL as described above. In an embodiment, N1=N2=N3=N4=4 bits.

At block 1130, last-arrived M bits are received at a fifth circuit, where the last-arrived M bits include a last-to-arrive N1 bit at the first circuit device, a last-to-arrive N2 bit at the second circuit device, a last-to-arrive N3 bit at the third circuit device, and a last-to-arrive N4 bit at the fourth circuit device. In an embodiment, the last-arrived M bit is determined as discussed above with respect to FIGS. 4-7. At block 1140, the first-arrived M bit at the fifth circuit is determined. In an embodiment, the first-arrived M bit is determined based on a relative time of arrival of the leading edge of each of the M bits at the fifth circuit. At block 1150, the input path of the first-arrived M bit is adjusted. In an embodiment, the adjustment includes adding delay such as by a DCDL as described above.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:

1. A method for aligning plural data bits where each data bit has an associated leading edge, the method comprising the steps of:
    (a) receiving a first plurality of the plural data bits via separate input paths of a first circuit device;
    (b) determining which of the first plurality of data bits arrives first based on a relative time of arrival of the leading edge of each of the first plurality of data bits;
    (c) adjusting the input path associated with the first-to-arrive bit of the first plurality of data bits, wherein the input path is adjusted such that the leading edge of the first-to-arrive bit is received within a predetermined threshold with respect to the leading edge of each of the first plurality of data bits;
    (d) receiving a second plurality of data bits of the plural data bits via separate input paths of a second circuit device;
    (e) determining which of the second plurality of data bits arrives first based on a relative time of arrival of the leading edge of each of the second plurality of data bits;
    (f) adjusting the input path associated with the first-to-arrive bit of the second plurality of data bits;
    (g) determining, at the first circuit device, which of the first plurality of bits arrives last based on a relative time of arrival of the leading edge of each of the first plurality of data bits;
    (h) determining, at the second circuit device, which of the second plurality of data bits arrives last based on a relative time of arrival of the leading edge of each of the second plurality of data bits;
    (i) receiving at a third circuit device a third plurality of data bits wherein the third plurality of data bits comprises the last-to-arrive bit of the first plurality of data bits and the last-to-arrive bit of the second plurality of data bits;

(j) determining which of the third plurality of data bits arrives first based on a relative time of arrival of the leading edge of each of the third plurality of data bits; and (k) adjusting the input path associated with the first-to-arrive bit of the third plurality of data bits.

2. The method of claim 1 wherein the first-to-arrive bit of the third plurality of data bits is one of the first plurality of data bits and the step of adjusting the input path associated with the first-to-arrive bit of the third plurality of data bits further includes adjusting the input path of each of the first plurality of data bits.

3. The method of claim 2 wherein each of the input paths of the first circuit device includes a digitally controlled delay line and the step of adjusting the input path of each of the first plurality of data bits comprises inserting a delay value in the input path for each of the first plurality of data bits by adjusting the digitally controlled delay line for each of the input paths of the first circuit device by an approximately equal amount.

4. The method of claim 1 wherein the input path associated with the first-to-arrive bit of the first plurality of bits includes a digitally controlled delay line and the step of adjusting includes adjusting the digitally controlled delay line.

5. The method of claim 1 wherein the first and second plurality of data bits include 4 bits.

6. The method of claim 1, wherein the first, second, and third pluralities of data bits have a same number of bits.

7. The method of claim 1, wherein the first, second, and third plurality of data bits include 4 bits.

8. The method of claim 1 wherein each of the input paths of the first circuit device includes a digitally controlled delay line and the step of adjusting the input path of each of the first plurality of data bits comprises inserting a delay value in the input path for each of the first plurality of data bits by adjusting the digitally controlled delay line for each of the input paths of the first plurality of data by an approximately equal amount.

9. An apparatus for aligning plural data bits where each data bit has an associated leading edge, comprising:
a first circuit device for receiving a first plurality of data bits of the plural data bits via separate input paths;
a first comparison circuit for determining which of the first plurality of data bits arrives first at said first circuit device based on a relative time of arrival of the leading edge of each of the first plurality of data bits;
a first timing adjustment circuit for applying a first adjustment to the input path associated with the first-to-arrive bit of the first plurality of data bits, wherein the input path is adjusted such that the leading edge of the first-to-arrive bit is received within a predetermined threshold with respect to the leading edge of each of the first plurality of data bits;
a second circuit device for receiving a second plurality of data bits of the plural data bits via separate input paths;
a second comparison circuit for determining which of the second plurality of data bits arrives first at said second circuit device based on a relative time of arrival of the leading edge of each of the second plurality of data bits and for determining which of the second plurality of data bits arrives last at said second circuit device based on a relative time of arrival of the leading edge of each of the second plurality of data bits;
a second timing adjustment circuit for applying a second adjustment to the input path associated with the first-to-arrive bit of the second plurality of data bits;

said first comparison circuit for determining which of the first plurality of data bits arrives last at said first circuit device based on a relative time of arrival of the leading edge of each of the first plurality of data bits;
a third circuit device for receiving a third plurality of data bits wherein the third plurality of data bits comprise the last-to-arrive bit of the first plurality of data bits and the last-to-arrive bit of the second plurality of data bits;
a third comparison circuit for determining which of the third plurality of data bits arrives first at said third circuit device based on a relative time of arrival of the leading edge of each of the third plurality of data bits; and
a third timing adjustment circuit for applying a third adjustment to an input path associated with the first-to-arrive bit of the third plurality of data bits.

10. The apparatus of claim 9 wherein said first timing adjustment circuit and said third timing adjustment circuit are the same.

11. The apparatus of claim 9 wherein the input path associated with the first-to-arrive bit of the first plurality of data bits and the input path associated with the first-to-arrive bit of the third plurality of data bits are the same.

12. The apparatus of claim 9 wherein said first timing adjustment circuit is a digitally controlled delay line.

13. The apparatus of claim 9 wherein the first-to-arrive bit of the third plurality of data bits is one of the bits of the first plurality of data bits and wherein each of the input paths for the remaining bits of the first plurality of data bits includes a separate timing adjustment circuit which applies, respectively for its associated input path, the third adjustment.

14. The apparatus of claim 9 wherein the first and second pluralities of data bits include 4 bits.

15. An apparatus for aligning plural data bits where each data bit has an associated leading edge, comprising:
a first circuit for determining a first-to-arrive bit and a last to arrive bit of a first plurality of data bits wherein each of said first plurality of data bits is associated with a separate input path;
a second circuit for determining a first-to-arrive bit and a last to arrive bit of a second plurality of data bits wherein each of said second plurality of data bits is associated with a separate input path, and wherein said second plurality of data bits are mutually exclusive of said first plurality of data bits;
a third circuit for determining a first-to-arrive bit and a last to arrive bit of third plurality of data bits wherein each of said third plurality of data bits is associated with a separate input path, and wherein said third plurality of data bits are mutually exclusive of said bits of the first and second pluralities of data bits;
a fourth circuit for determining a first-to-arrive bit and a last to arrive bit of a fourth plurality of data bits wherein each of said fourth plurality of data bits is associated with a separate input path, and wherein said fourth plurality of data bits are mutually exclusive of said bits of the first, second, and third pluralities of data bits;
a fifth circuit for receiving a fifth plurality of data bits wherein the fifth plurality of data bits comprise the last-to-arrive bit of the first plurality of data bits, the last-to-arrive bit of the second plurality of data bits, the last-to-arrive bit of the third plurality of data bits and the last-to-arrive bit of the fourth plurality of data bits;
a comparison circuit for determining which of the fifth plurality of data bits arrives first and which of the fifth plurality of data bits arrives last at said fifth circuit based on a relative time of arrival of the leading edge of each of the fifth plurality of data bits; and a timing adjustment circuit for applying an adjustment to an input path associated with the first-to-arrive bit of the fifth plurality of data bits based on a determination made by the comparison circuit.

16. The apparatus of claim 15 wherein the first, second, third, fourth and fifth pluralities of data bits each includes 4 bits.

* * * * *